United States Patent [19]

Ozawa et al.

[11] Patent Number: 4,849,876
[45] Date of Patent: Jul. 18, 1989

[54] ADDRESS TRANSLATION CIRCUIT INCLUDING TWO TRANSLATION BUFFERS

[75] Inventors: Koji Ozawa; Manabu Araoka; Soichi Takaya, all of Hitachi, Japan

[73] Assignee: Hitachi, Ltd., Tokyo, Japan

[21] Appl. No.: 29,161

[22] Filed: Mar. 23, 1987

[30] Foreign Application Priority Data

Mar. 25, 1986 [JP] Japan .................................. 61-64976

[51] Int. Cl.[4] ............................................. G06F 12/02
[52] U.S. Cl. .................................................... 364/200
[58] Field of Search ... 364/200 MS File, 900 MS File, 364/200, 900

[56] References Cited

U.S. PATENT DOCUMENTS

| | | | |
|---|---|---|---|
| 4,386,402 | 5/1983 | Toy | 364/200 |
| 4,403,283 | 9/1983 | Myutti et al. | 364/200 |
| 4,453,230 | 6/1984 | Mizoguchi et al. | 364/900 |
| 4,500,952 | 2/1985 | Heller et al. | 364/200 |
| 4,502,110 | 2/1985 | Saito | 364/200 |
| 4,527,238 | 7/1985 | Ryan et al. | 364/200 |
| 4,638,426 | 1/1987 | Chang et al. | 364/200 |
| 4,700,291 | 10/1987 | Saito | 364/200 |
| 4,719,568 | 1/1988 | Carrubba et al. | 364/200 |
| 4,727,484 | 2/1988 | Saito | 364/200 |

Primary Examiner—Eddie P. Chan
Assistant Examiner—Paul Kulik
Attorney, Agent, or Firm—Antonelli, Terry & Wands

[57] ABSTRACT

An address translation circuit for translating a logical address into a physical address in a computer system using a virtual storage method includes two high-speed buffers (TLB's) for an instruction and an operand, respectively. One of the buffers is selected for use at the time of a memory access depending on a signal supplied from a processing unit to indicate whether the memory access is related to an instruction cycle or an operant cycle. This configuration enables a high-speed address translation without lowering the TLB hit rate and without increasing the amount of the hardware components.

2 Claims, 9 Drawing Sheets

ADDRESS TRANSLATION CIRCUIT INCLUDING TWO TRANSLATION BUFFERS

BACKGROUND OF THE INVENTION

The present invention relates to a circuit for translating an address in a computer system using a virtual storage method.

A processor to support a virtual storage requires an address translation circuit for translating a logical address into a physical address. As such an address translation method, a segmentation/paging composite method is applied to a case where a large logical space is used. In this method, for example, the logical space is divided into several segments and each segment is further subdivided into a plurality of pages. There are disposed a segment table ST and a page table PT (these tables are referred to as translation tables) to indicate whether a particular page in a particular segment exists in the main storage or not and when they are found to be present, indicate their physical addresses in the main storage. Thus, the address translation in this method is achieved through a 2-stage translation by use of these two tables. This provision is adopted because it will increase the amount of the hardware elements to provide a table which establishes a one-to-one correspondence between all logical addresses in the logical space and the physical addresses.

Referring now to FIG. 1 which is an explanatory diagram of the segmentation/paging composite method, the segmentation/paging composite method will be explained.

The segment table ST and the page table PT are provided in the main storage. A segment table origin register STOR provided in the address translation mechanism is used to store the top address STTOP of the segment table ST. By accessing an address in the segment table assigned or specified by the top address STTOP and the SEG field of a specified logical address LA, that top address PTTOP of the page table PT which corresponds to the segment (SEG) field of the logical address LA is read and then the obtained top address PTTOP is set in a page table register (not shown) provided in the address translation mechanism. Subsequently, by accessing an address in the page table PT assigned or specified by the content of the page table register and the page field PAGE of the logical address, the top address PAGETOP of the page corresponding to the page field PAGE of the logical address LA is read. This read PAGETOP is the upper-order portion of the physical address. The lower-order portion OFFSET of the logical address LA is the lower-order portion of the physical address as it is. Thus, the physical address can be obtained by combining the PAGETOP and lower-order portion OFFSET of the logical address LA. However, in this address translation method, the tables ST and PT are accessed to translate a logical address into a physical address, namely, the main storage is twice accessed, which results in a time-consuming address translation.

To overcome this, there can be considered an address translation method using a high-speed translation buffer or translation lookaside buffer (TLB) which functions like the translation table.

FIG. 2 is an explanatory diagram of an address translation method using such a TLB, and FIG. 3 shows an example of the logical address in this case. Namely, the logical address 67 of this example includes an upper-order portion LAU (17 bits), an intermediate portion LAM (3 bits), and a lower-order portion OFFSET (12 bits): Although the TLB 60 comprises eight entries corresponding to 3-bit LAM, only one entry is shown in the TLB 60 of FIG. 2. In each entry are registered the upper-order LAU of the logical address and the PAGETOP respectively corresponding to the top addresses of the segment and the page for an instruction or operand which was recently accessed and exists in the main storage. When the main storage is to be accessed, in order to determine whether or not the inputted logical address 67 exists in the TLB, the TLB is read to obtain an entry corresponding to the LAM of the logical address 67. The LAU 62 in the entry is then compared with the LAU 64 of the accessed logical address 67 by means of a comparator 61 whether they are identical (to be referred to as a TLB hit hereafter) or not identical (to be referred to as a TLB mishit). If a hit results, the PAGETOP in the entry and the OFFSET 66 of the accessed logical address 67 are combined to generate a physical address 68. In the case of TLB mishit, since this PAGETOP is invalid, the address translation is accomplished according to the address translation method of FIG. 1 to obtain the LAU and the PAGETOP, which in turn are registered to an entry of the TLB. Consequently, TLB hit results for the subsequent access to the pertinent address. In this method, the main storage is not accessed in the case of TLB hit, and hence the address translation can be performed at a higher speed as compared with the method of FIG. 1.

FIG. 4 shows a method using one TLB described above. This method has been proposed in the JP-A-61-217846 laid-open on Sept. 27, 1986 (Japanese Patent Application No. 60-57576 filed on Mar. 23, 1985 in the name of the same assignee of the present application). The operation of this translation method is the same as the operation described in conjunction with FIG. 2. But, it is to be noted here that, in FIG. 4, the LAU 64 of the logical address 67 and the data bus 69 are inputted to the TLB. This is because the LAU and the PAGETOP corresponding to the data read from the main storage are to be registered to the TLB 60 when TLB mishit occurs.

FIG. 5 shows an example using two TLB's similar to that described in the JP-B-1658 and the like. Although the method for selecting an entry of the TLB is the same as in he case of one TLB scheme, since two TLB's are used in this method, two comparators 72 and 73 are necessary for the judgment of TLB hit by comparing the LAU's 76 and 78 respectively registered to the TLB's 70 and 71 with the LAU 64 of the logical address 67 to be accessed. Further, there must be also provided a selector 75 for determining, based on the comparison results 80 and 81, which one of TLB's is indicating the TLB hit and selecting the PAGETOP 77 or 79 registered in the TLB which shows the TLB hit and a control circuit 74 for outputting a select signal 82 to control the selector 75. If hit does not occur in the TLB 70 nor in the TLB 71, the translation method of FIG. 1 is also executed and after the translation, for the registration of the entry to the TLB, LRU control method or the like is used, namely, an entry to which data has been more previously registered and which contains the old contents (LAU, PAGETOP, etc.) is updated with new contents.

The above-mentioned schemes using one or two TLB's have the following problems. Assume in the 1-TLB method of FIG. 4 that the logical address is represented by 8 hexadecimal characters and that the 5th character from the most significant bit thereof is an intermediate section LAM used to select an entry of the TLB as shown in FIG. 6. If a logical address at which an instruction is stored in the main storage is 3E503000, the entry number of the TLB is 3. Further, assuming that data to be used by the instruction is stored at a logical address 6F253000, the entry number of the TLB is also 3, which means that the instruction area and the data area use the same entry of the TLB. In such a case, when the instruction cycle and the operand cycle are alternately executed, mishit occurs repetitiously, which leads to a problem that the hit rate is abruptly lowered.

On the other hand, in the 2-TLB method of FIG. 5, the situation associated with the problem of the 1-TLB method does not cause any problem because of two TLB's. In this method however, until the judgment of the TLB hit is finished for both TLB's, selection of one PAGETOP to be used as a part of the physical address out of two PAGETOP's registered in the TBL's must be deffered. Consequently, the speed of the address translation to obtain the physical address is lowered when compared with the 1-TLB method. Moreover, since a comparator is necessary for each TLB, there arises a problem that the amount of hardware elements is increased as compared with the 1-TLB method.

SUMMARY OF THE INVENTION

It is therefore an object of the present invention to provide an address translation circuit for use in a computer system using a virtual storage method, in which a high-speed address translation can be achieved without lowering the TLB hit rate and without greatly increasing the amount of the hardware components.

To achieve the object, according to one aspect of the present invention, two TLB's are provided in a configuration in which one of the TLB's is used for an instruction and the other thereof is dedicated to an operand and during the memory cycle, a signal is outputted from the processor to indicate whether the current cycle is an instruction cycle or an operand cycle, thereby determining one of the TLB's to be used.

More specifically, according to the present invention, there are provided a TLB for an instruction and a TLB for an operand so as to discriminately store data representing the position where the instruction is stored and data representing the position where the data or operand is stored, respectively. Consequently, even when the instruction and the data are linked to the same entry, the contents currently stored in the entry need not to be removed and hence mishits are not increased. Furthermore, based on a signal outputted from the processor to indicate whether the access is the instruction cycle or the operand cycle, one of the TLB's to be used is determined without waiting for the result of the TLB hit judgment, which enables the address translation to be conducted at as high a speed as the 1-TLB method.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
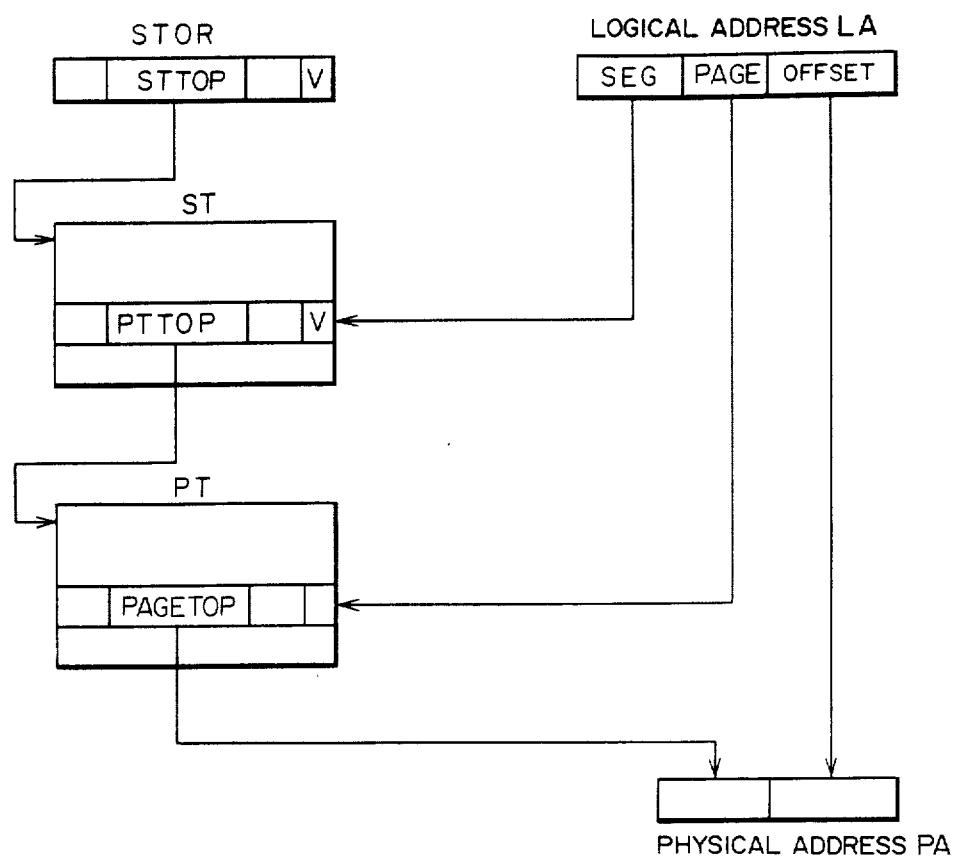
FIG. 1 is an explanatory diagram of a translation method to translate a logical address into a physical address.
Figure 2:
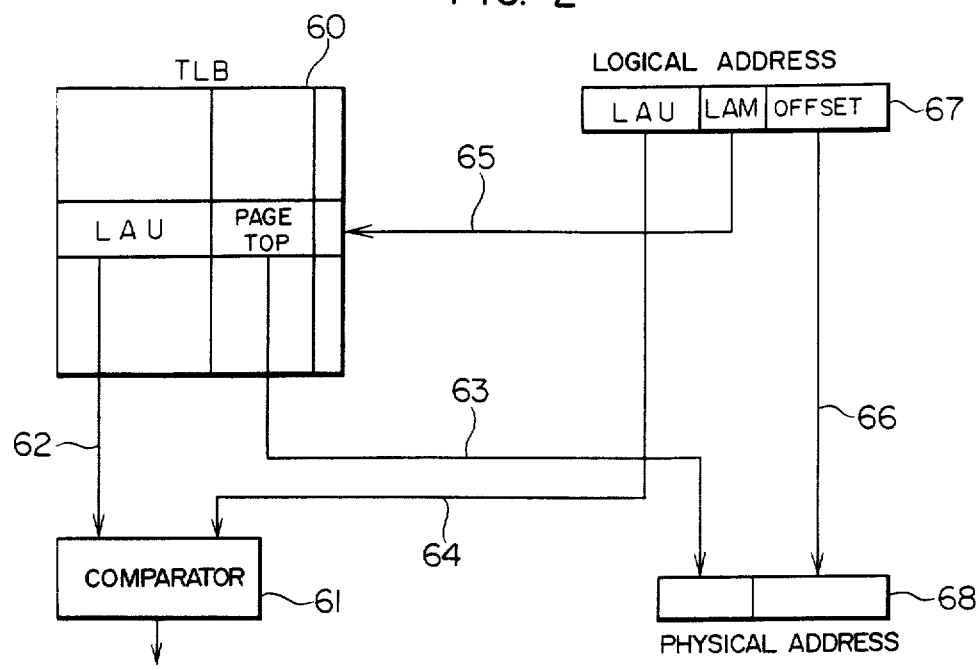
FIG. 2 is a schematic diagram for explaining the operation of a TLB.

Embodiments of the present invention will be described with reference to the accompanying drawings. In the drawings, the same reference numerals are assigned to the same members and the description thereof will not be repeatedly given unless such description is necessary.

Figure 7:
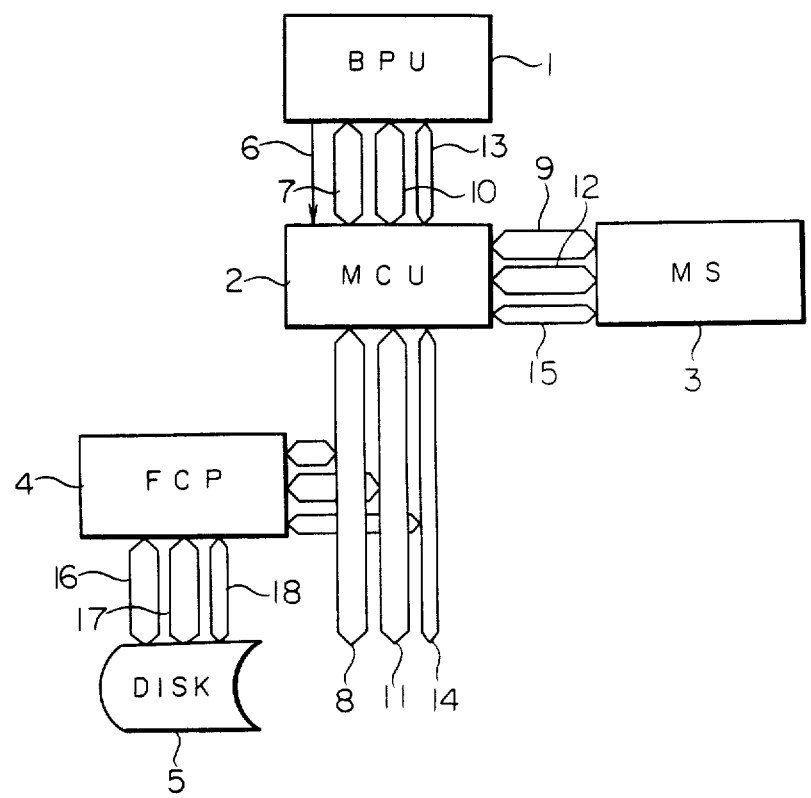
FIG. 7 is a configuration diagram of a computer system using a virtual storage method to which the present invention is applicable.

An embodiment will be described according to the present invention. FIG. 7 is a schematic diagram showing the overall configuration of a system to implement the present invention. This system comprises a basic processing unit (BPU) 1, a memory control unit (MCU) 2, a main storage (MS) 3, a file control processor (FCP) 4, and a disk unit (DISK) 5, which are connected by use of address lines 7-9, data lines 10-12, and control lines 13-15. A signal 6 indicates whether the memory access is related to an instruction cycle or an operand cycle. The file control processor 4 and the disk unit 5 are connected to each other by use of a data line 16, a function line 17, and a status line 18. The programs to be executed by the basic processing unit 1 are stored in the disk unit 5 and a portion thereof is loaded in the main storage 3 for execution.

Figure 8:
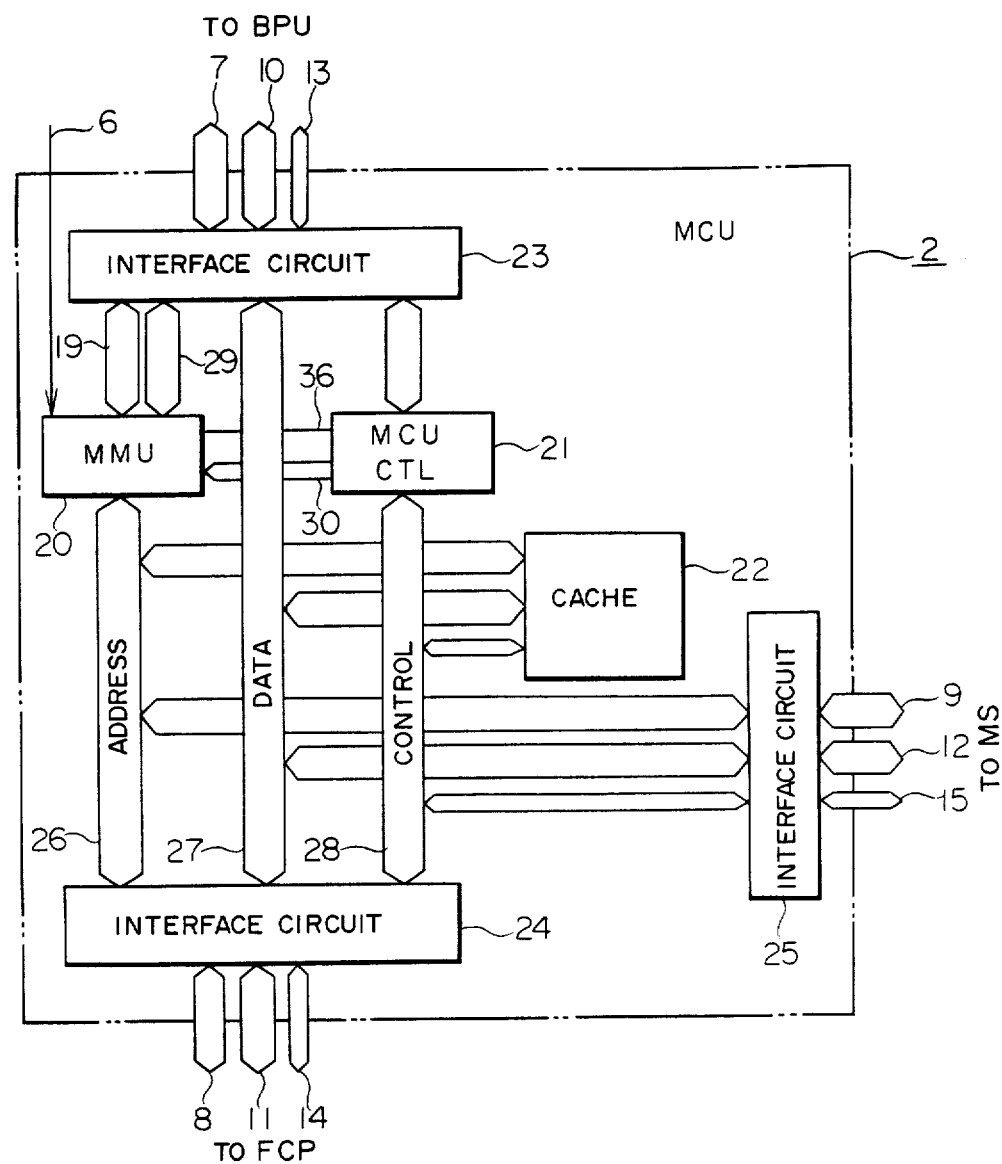
FIG. 8 is a schematic block diagram showing a structure of the memory control unit of FIG. 7.

FIG. 8 shows a configuration of the memory control processor 2 comprising an address translation section (MMU) 20, cache memory (CACHE) 22 for holding some of the data stored in the MS 3, and a control circuit (MCUCTL) 21 for controlling the entire system. These constituent components are connected by use of internal signal buses 26-28 respectively corresponding to the address, data, and control; moreover, the signals on the respective signal buses are connected via the interface circuits 23-25 to the basic processing unit 1, the file control processor 4, and the main storage 3, respectively. In the case of a memory access from the basic processing unit 1, the address translation section 20 is supplied with a logical address via the address line 7, a signal 6 indicating whether the memory cycle is the instruction cycle or the operand cycle, and a control signal outputted from the control circuit 21. Here, the logical address is translated into a physical address, and then the cache memory 22 is accessed via the internal signal bus. And, when, as a result, the fact that data corresponding to the physical address is stored in the cache memory 22 is indicated and also the TLB hit judgment signal 36 outputted from the address translation section 20 indicates a hit state, the control circuit 21 notifies the end of access to the basic processing unit 1 via the control line circuit 23 and the interface 13. On receiving this notification of the end of access, the basis processing unit 1 fetches data from the cache memory 22 through the bus 27. If a mishit occurs in the cache memory 22, the main storage is accessed via the internal signal buses 26 and 28 and the interface circuit 25 and the data fetched from the main storage is transferred to the basic processing unit 1 and is written at the same time in the cache memory 22. In addition, accessing of the file control processor 4 by the basic processing unit 1 is achieved via the internal signal buses 26–28 and the interface circuit 24.

Figure 3:
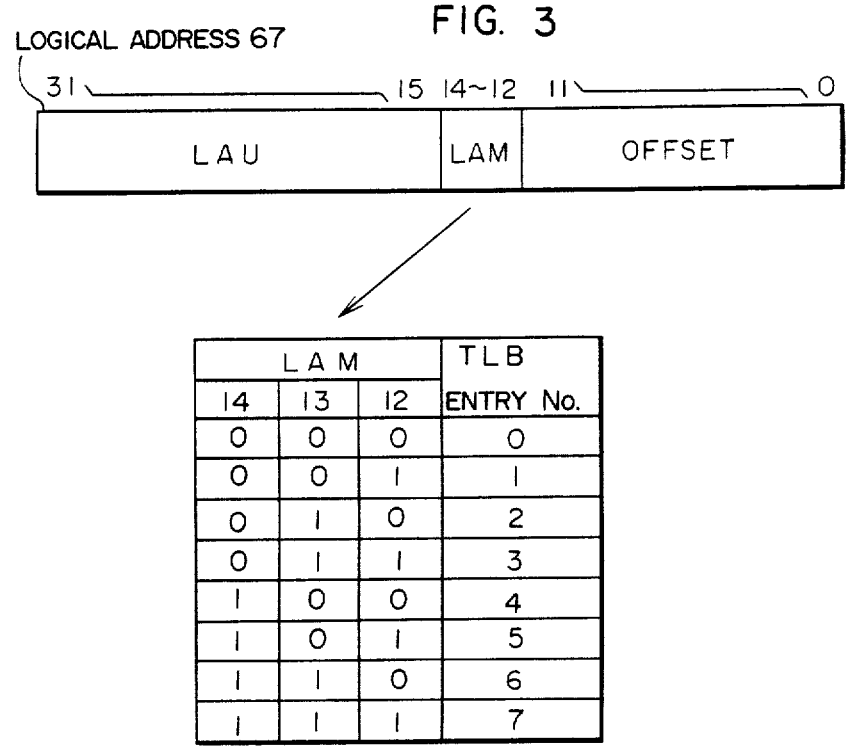
FIG. 3 is a schematic diagram illustrating a configuration of a logical address when a TLB is used.
Figure 4:
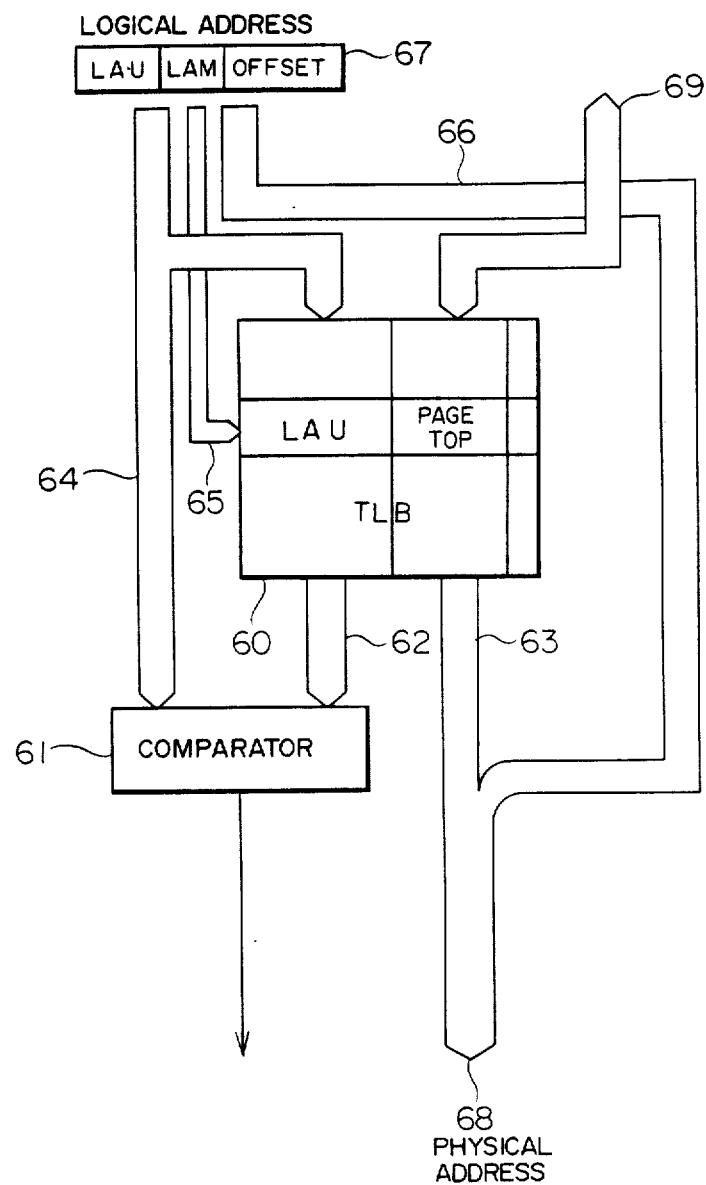
FIG. 4 is a configuration diagram of a translation circuit when one TLB is used.
Figure 5:
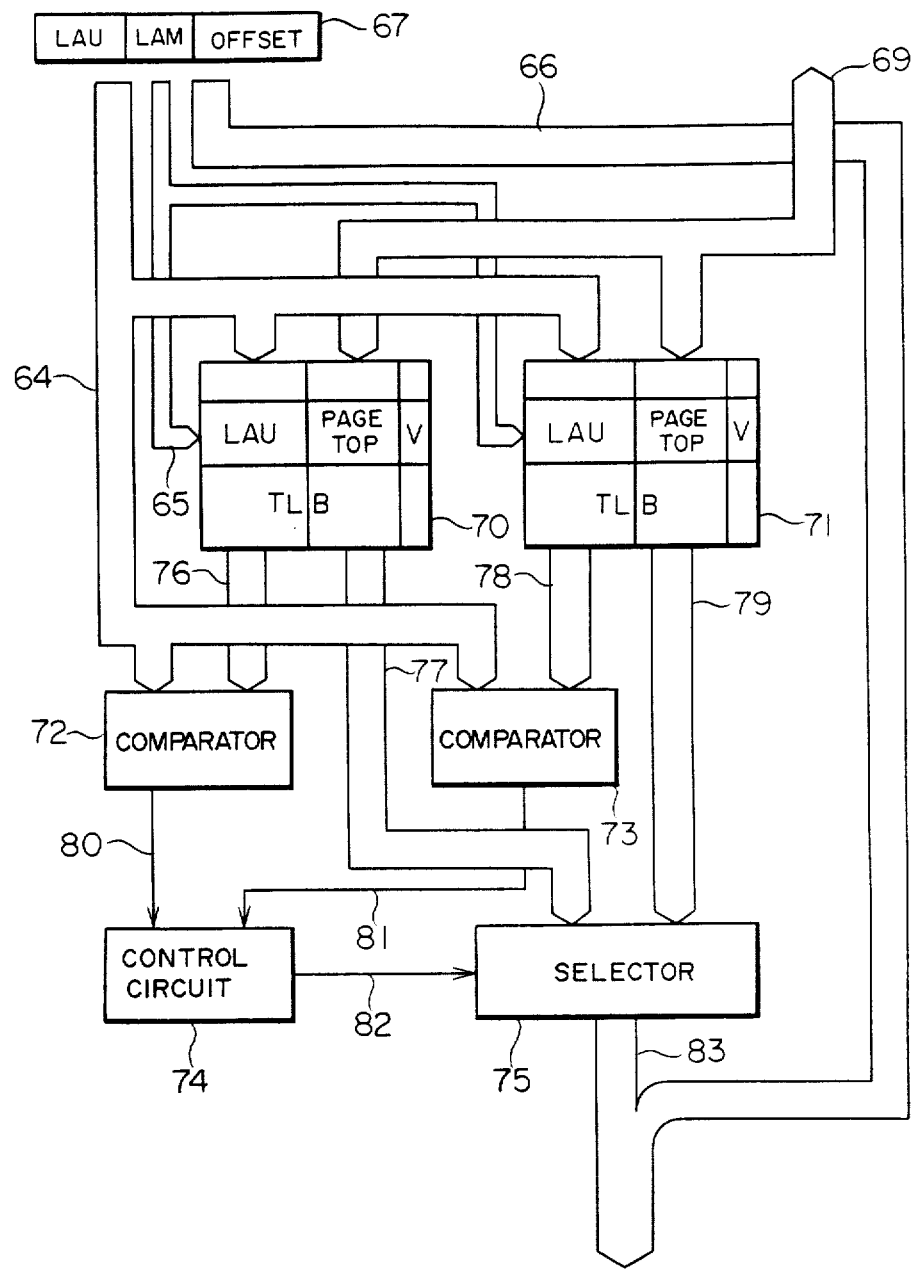
FIG. 5 is a configuration diagram of a conventional translation circuit when two TLB's are used.
Figure 6:
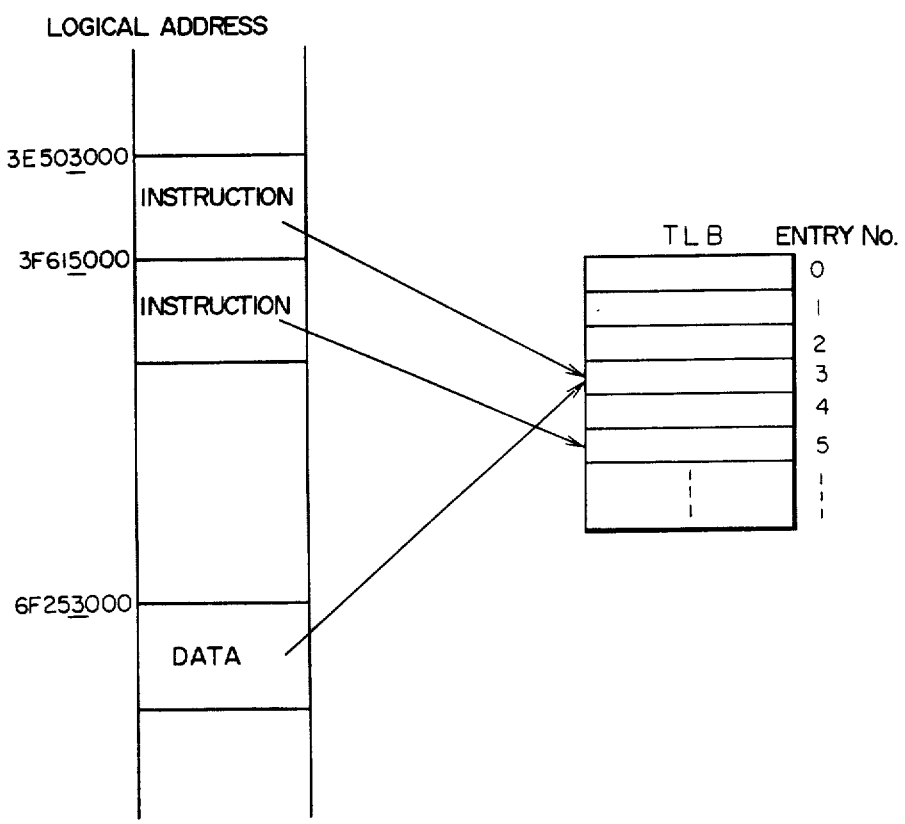
FIG. 6 is a schematic diagram useful for explaining the problem of a 1-TLB method.
Figure 9:
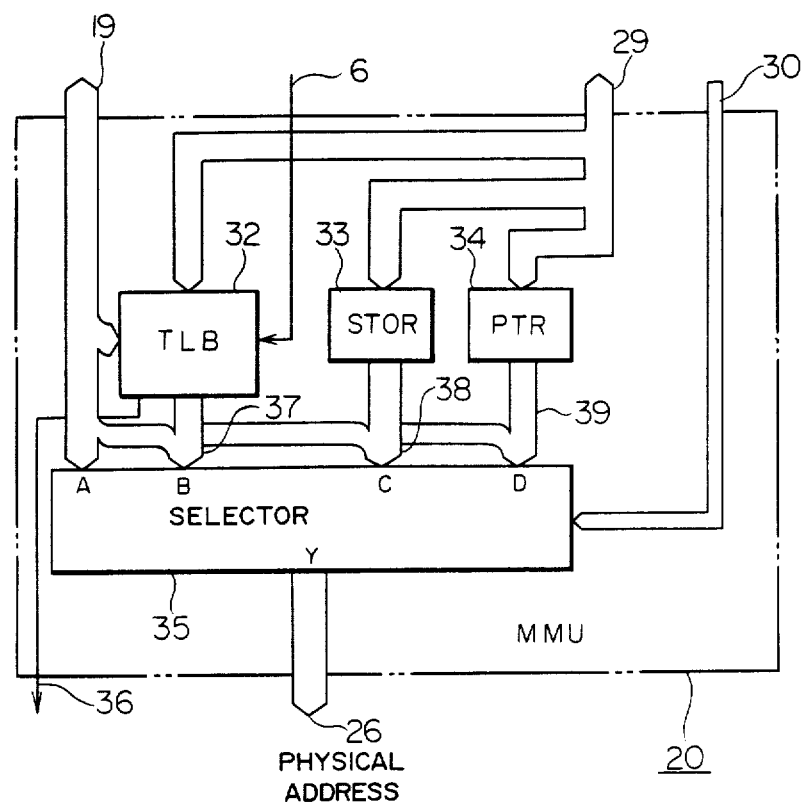
FIG. 9 is a block diagram of an embodiment of the address translation section of FIG. 8 according to the present invention.

FIG. 9 shows a configuration diagram of the address translation section 20. A TLB 32 is a buffer for implementing a high-speed address translation, while a segment table origin register 33 and a page table register 34 are registers to be used for an address translation when mishit occurs for the TLB 32. When an access from the basic processing unit 1 is to be effected in the V=R space, the logical address is identical to the physical address; consequently, a selector 35 outputs as a physical address the logical address 19 supplied to the input A of the selector 35. When the access from the basic processing unit 1 is to be conducted in other than the V=R space and hit occurs for the TLB 32, the page top address registered in the entry of the TLB 32 for which hit has occurred and the offset field of the logical address 19 are combined to generate a physical address 37, which is then outputted to the input B of the selector 35. If mishit occurs for the TLB 32, the segment table on the main storage 3 is first referred to obtain the top address of the page table. In this case, a signal 38 obtained by combining the content of the segment table origin register 33 with the segment field of the logical address 19 is outputted to the input C of the selector 35. Subsequently, the page table in the main storage 3 is referred to obtain the page top address. In this case, a signal 39 obtained by combining the content of the page table register 34 with the page field of the logical address 19 is outputted to the input D of the selector 39. The operation of the selector 35 is controlled by the control signal 30 from the control circuit 21 of FIG. 9. Incidentally, the page table register 34 is beforehand set with the top address of the page table outputted from the segment table through an access by the signal 38 supplied to the input C. And, when the signal 39 fed to the D input causes to access an address associated with this signal 39 in the page table in the main storage 3, the top address of the page corresponding to the page field of the logical address 19 is read. The obtained top address is the upper-order portion of the physical address. Since the lower-order portion of the physical address is identical to the lower-order portion OFFSET of the logical address 19, the top address and the OFFSET are combined to generate the physical address. This is the same as in the case of FIG. 1. In this connection, in the case of the configurations of FIGS. 9 and 8 and in the case of TLB hit, the logical address takes the form such that it is composed of the upper-order portion LAU, the intermediate portion LAM, and the lower-order portion OFFSET, as shown in Fig. 3, whereas in the case of TLB mishit, it takes the form such that it comprises the upper portion SEG and the intermediate portion PAGE as shown in FIG. 1 and the lower-order portion OFFSET which is the same as that of FIG. 3, as if there are two different logical addresses. However, these logical addresses are not two different ones but the same one, only the position dividing the upper-order portion and the intermediate portion being different. For example, assume that the logical address comprises 32 bits. In the case of FIG. 3, the OFFSET, LAM, and LAU are constituted from bits 0–11, 12–14 (3 bits), and 15–31 (17 bits), respectively; whereas, in the case of FIG. 1, the OFFSET, PAGE, and SEG portions are constituted from bits 0–11, 12–21 (10 bits, namely, $2^{10}=1024$ pages), and 22–31 (10 bits), respectively.

Figure 10:
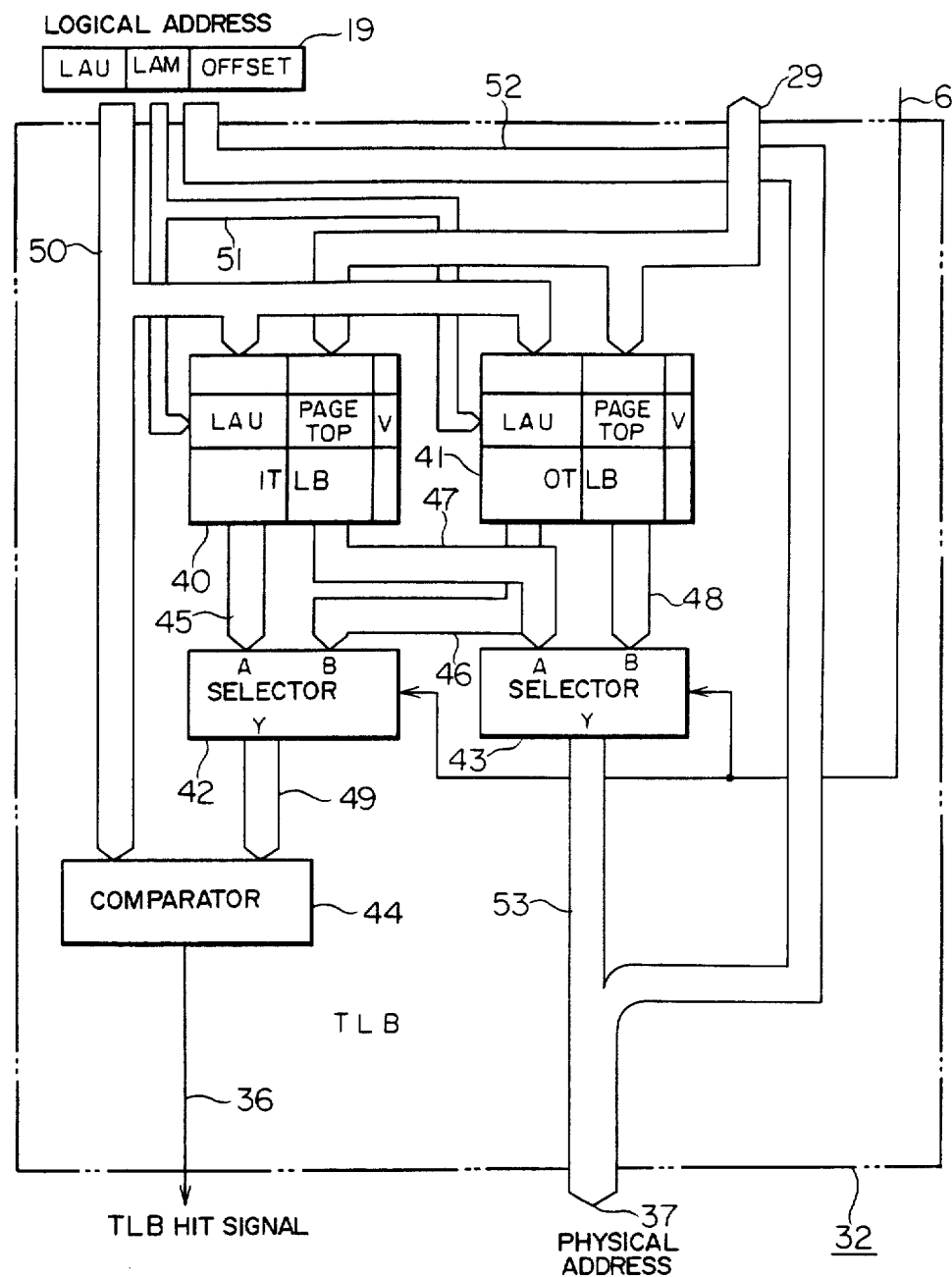
FIG. 10 is a simplified circuit diagram illustrating an embodiment of an address translation circuit according to the present invention.

The address translation circuit of the present invention resides in the TLB 32 of FIG. 9 and FIG. 10 is an embodiment of the present invention. The logical address 19 shown in FIG. 10 includes an upper-order LAU, an intermediate LAM (TLB entry selection bit), and a lower-order OFFSET as described in conjunction with FIG. 3. That is, the intermediate LAM is constituted of 3 bits and hence there are included 1 entries in total, namely, 8 entries each for the instruction TLB (ITLB) 40 and operand TLB (OTLB). When a memory access from the basic processing unit 1 is initiated, based on the intermediate portion 51 of the logical address 19 transferred via the address line 7 and the interface circuit 23, an entry is selected from the 8 entries each for the ITLB 40 and OTLB 41; and at the same time, a signal 6 supplied from the basic processing unit 1 to indicate whether or not the memory access is associated with the instruction cycle or the operand cycle is inputted to the selectors 42, 43 together with the logical address 19. For the instruction cycle, the upper-order portion 45 and page top address 47 of the ITLB 40 is selected by and outputted from the selectors 42 and 43. For the operand cycle, the upper-order portion 46 and page top address 48 of the OTLB 41 are selected by and outputted from the selectors 42, 43. Since the selectors 42, 43 are in a select enable state before the entries are read from the TLB's 40, 41, the output signals 49 and 53 of the selectors are established as soon as the TLB output signals are established, which unnecessitates the time to be used for the selection.

The output signal 49 from the selector 42, namely, the selected upper-order portion of the address is compared with the upper-order portion of the logical address 19 by means of the comparator 44 to judge whether or not TLB hit occurs. On the other hand, the output signal 53 from the selector 43, namely, the selected page top address is combined with the offset 52 of the accessing logical address 19 to generate and output a physical address 37, which enables the accessing of the cache memory 22 (FIG. 8) without waiting for the TLB hit judgment. The judge signal 36 outputted from the comparator 44 is fed to the control circuit 21. If hit results, the control circuit 21 indicates the physical address 37 to be valid and continues the access control on the cache memory 22 to effect a hit judgment to determine whether data corresponding to the physical address has been stored in the cache memory 22. If the hit judgment on the TLB 32 results in mishit, the physical address 37 is invalid and hence the control circuit 21 activates again the address translation section 20 by use of the control signal 30, which causes the operations to be executed to refer to the segment table and the page table by use of the registers 33, 34. The page top address 29 is then registered in the TLB 32 together with the upper-order portion 50 of the logical address 19 by the control circuit 21.

According to the present invention, even when an instruction area and a data area to be used by the instruction are linked to the same entry of a TLB, the TLB hit rate is not deteriorated and a physical address can be outputted without waiting for the TLB hit judgment, which leads to an advantageous effect that the address translation can be conducted at a high speed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An address translation circuit for use in a virtual storage system in which a string of logical addresses inputted from processing means at a time of memory access is translated into physical addresses by use of translation tables in a main storage and said main storage or a secondary storage is accessed according to the translated physical addresses in order to read therefrom instruction data and operand data, said string of logical addresses includes both logical addresses for instruction data and logical addresses for operand data comprising:

first translation buffer means including as entries therein a plurality of first pairs, wherein each first pair includes an upper-order portion of a physical address indicating a location at which instruction data is stored in the main storage and an upper-order portion of a logical address of said instruction data and wherein each first pair is stored in said first translation buffer means at an address corresponding to an intermediate portion of a logical address;

second translation buffer means including as entries therein a plurality of second pairs, wherein each second pair includes an upper-order portion of a physical address indicating a location at which operand data is stored in the main storage and an upper-order portion of a logical address of said operand data and wherein each second pair is stored in said second translation buffer means at an address corresponding to an intermediate portion of a logical address;

select means responsive to a select signal supplied from said processing means to indicate whether or not the memory access is directed to an instruction data or to an operand data, for selecting one of said entries read from the first and second translation buffer means at the time of a memory access which corresponds to the select signal; and comparing means for comparing an upper-order portion of a logical address in an entry selected by said select means with an upper-order portion of a logical address inputted by said processing means and for outputting a signal indicating whether a physical address obtained by combining the upper-order portion of the selected entry of the physical address with the lower-order portion of the logical address inputted by said processing means is valid when said upper-order portion of said logical address of said entry selected by said select means agrees with said upper-order portion of said logic address inputted by said processing means.

2. An address translation circuit according to claim 1, wherein said select means comprises:

first selector means for receiving as inputs thereto an upper-order portion of a logical address of an entry read from said first translation buffer means and an upper-order portion of a logical address of an entry read from said second translation buffer means and for supplying one of said upper-order portions received as inputs to said comparing means in response to the select signal; and second selector means for receiving as inputs thereto an upper-order portion of a physical address of an entry read from said first translation buffer means an upper-order portion of a physical address of an entry read from the second translation buffer and for outputting one of said upper-order portions received as inputs in response to the select signal.

* * * * *